United States Patent
Reynolds et al.

(10) Patent No.: US 8,605,866 B2
(45) Date of Patent: ***Dec. 10, 2013

(54) SYSTEM AND METHOD FOR BROADCASTING PACKETIZED VOICE MESSAGES

(75) Inventors: Douglas F. Reynolds, Austin, TX (US); Jeffrey Lewis Brandt, Cedar Park, TX (US); Aaron Bangor, Austin, TX (US); Marc Andrew Sullivan, Austin, TX (US)

(73) Assignee: AT&T Intellectual Property I, L.L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/558,044

(22) Filed: Jul. 25, 2012

(65) Prior Publication Data

US 2013/0028402 A1    Jan. 31, 2013

Related U.S. Application Data

(63) Continuation of application No. 10/774,057, filed on Feb. 6, 2004, now Pat. No. 8,290,127.

(51) Int. Cl.
*H04M 1/64*    (2006.01)
*H04L 12/66*    (2006.01)

(52) U.S. Cl.
USPC ........................................ 379/88.12; 370/352

(58) Field of Classification Search
USPC .................... 379/88.01–88.13, 352
See application file for complete search history.

(56) References Cited

U.S. PATENT DOCUMENTS

| | | | |
|---|---|---|---|
| 6,614,896 B1 | 9/2003 | Rao | |
| 6,643,355 B1 | 11/2003 | Tsumpes | |
| 6,792,094 B1 | 9/2004 | Kirkpatrick | |
| 7,379,421 B1 | 5/2008 | Gao et al. | |
| 7,418,086 B2 | 8/2008 | Sravanapudi et al. | |
| 7,499,529 B1* | 3/2009 | Kvache et al. | 379/88.22 |
| 2001/0055963 A1* | 12/2001 | Cloutier | 455/417 |
| 2004/0125931 A1 | 7/2004 | Archer | |
| 2004/0181587 A1* | 9/2004 | Cao et al. | 709/206 |
| 2004/0208296 A1* | 10/2004 | Aboujaoude et al. | 379/88.12 |
| 2004/0225733 A1 | 11/2004 | Tesink et al. | |
| 2005/0086685 A1 | 4/2005 | Rahman et al. | |
| 2005/0135383 A1 | 6/2005 | Shenefiel | |
| 2005/0169443 A1* | 8/2005 | Rosenthal | 379/88.17 |
| 2006/0098576 A1 | 5/2006 | Brownrigg et al. | |

(Continued)

OTHER PUBLICATIONS

Non-Final Office Action for U.S. Appl. No. 10/774,057 received from the United States Patent and Trademark Office (USPTO) mailed Mar. 13, 2010, 23 pages.

(Continued)

*Primary Examiner* — Simon Sing
*Assistant Examiner* — Solomon Bezuayehu
(74) *Attorney, Agent, or Firm* — Toler Law Group, PC

(57) ABSTRACT

A particular method includes initiating outbound calls associated with at least two recipients that are to receive a notification message. The outbound calls include a first call to a first telephone address associated with a first recipient of the at least two recipients. The method further includes, in response to a determination that the first call is unanswered, initiating a second call to a second telephone address associated with the first recipient and initiating generation of an email message to an electronic mail address associated with the first recipient.

20 Claims, 2 Drawing Sheets

(56) References Cited

U.S. PATENT DOCUMENTS

2007/0127707 A1 6/2007 Koser et al.
2009/0180596 A1 7/2009 Reynolds et al.
2011/0096918 A1 4/2011 Lee

OTHER PUBLICATIONS

Final Office Action for U.S. Appl. No. 10/774,057 received from the United States Patent and Trademark Office (USPTO) mailed Jun. 22, 2010, 28 pages.

Non-Final Office Action for U.S. Appl. No. 10/774,057 received from the United States Patent and Trademark Office (USPTO) mailed Jan. 18, 2010, 24 pages.

Final Office Action for U.S. Appl. No. 10/774,057 received from the United States Patent and Trademark Office (USPTO) mailed Jul. 8, 2011, 24 pages.

Notice of Allowance for U.S. Appl. No. 10/774,057 received from the United States Patent and Trademark Office (USPTO) mailed May 2, 2012, 34 pages.

* cited by examiner

SYSTEM AND METHOD FOR BROADCASTING PACKETIZED VOICE MESSAGES

CROSS REFERENCE TO RELATED APPLICATIONS

This application is a continuation of, and claims priority from, U.S. patent application Ser. No. 10/774,057, filed Feb. 6, 2004 and entitled "SYSTEM AND METHOD FOR BROADCASTING PACKETIZED VOICE MESSAGES," which is hereby incorporated by reference in its entirety.

FIELD OF THE DISCLOSURE

The present disclosure relates generally to notification services, and more specifically to a system and method for broadcasting packetized voice messages.

BACKGROUND

Depending on implementation details, a notification service may effectively provide a subscriber or group of subscribers with timely information. One relatively well-known notification service was originally referred to as the Emergency Broadcast System (EBS). The EBS was designed to inform the public of emergency situations and to make use of a broadcasting syndicate that included Amplitude Modulation (AM) radio, Frequency Modulation (FM) radio, and Television (TV) broadcast stations.

In recent years, the Emergency Alert System (EAS) has effectively replaced the EBS. In addition to the broadcasting organizations mentioned above, the EAS also includes cable companies providing broadcast video services. Participation in national EAS alerts is mandatory for these broadcasting entities. Participation in state and local area EAS alerts is voluntary.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

DETAILED DESCRIPTION

Embodiments discussed below describe, in part, the broadcasting of Voice over Internet Protocol (VoIP) messages. From a high level, VoIP technology relates to a set of facilities for managing the delivery of voice information using the Internet Protocol (IP). Delivery of voice information using IP involves sending audio information in discrete packets rather than sending the information across the more traditional circuit-committed protocols of the public switched telephone network (PSTN). Though many of the embodiments discussed below focus on VoIP technology, other packetized call techniques may be used.

An example technique incorporating teachings of the present disclosure may include receiving a signal that indicates a message should be delivered to a plurality of recipients. In response, contact information for the plurality of recipients may be identified, and an outbound packetized call to each of the recipients may be launched. In practice, the packetized call may be in a VoIP form or some other appropriate packetized form. If a call is answered, the call may be connected to a multicast server capable of playing the to-be-delivered message, which may be saved in a playable file format like .WAV, MP3, .MIDI, .AU, .AIFF, and/or some other format.

By employing the teachings disclosed herein, an operator may be able to make use of VoIP-like technology to implement a network-based message broadcasting system. The network may include a PSTN, a cable network, the Public Internet, a managed IP network, and/or some other network capable of supporting the packet-based communication of information. The solution may allow, in some embodiments, for a large scale broadcast of VoIP communication to a large number of VoIP subscribers. The subscribers could be targeted for a variety of reasons including geography, demographics, association with a particular group, entity, and/or cause, or some other suitable reason.

Figure 2:
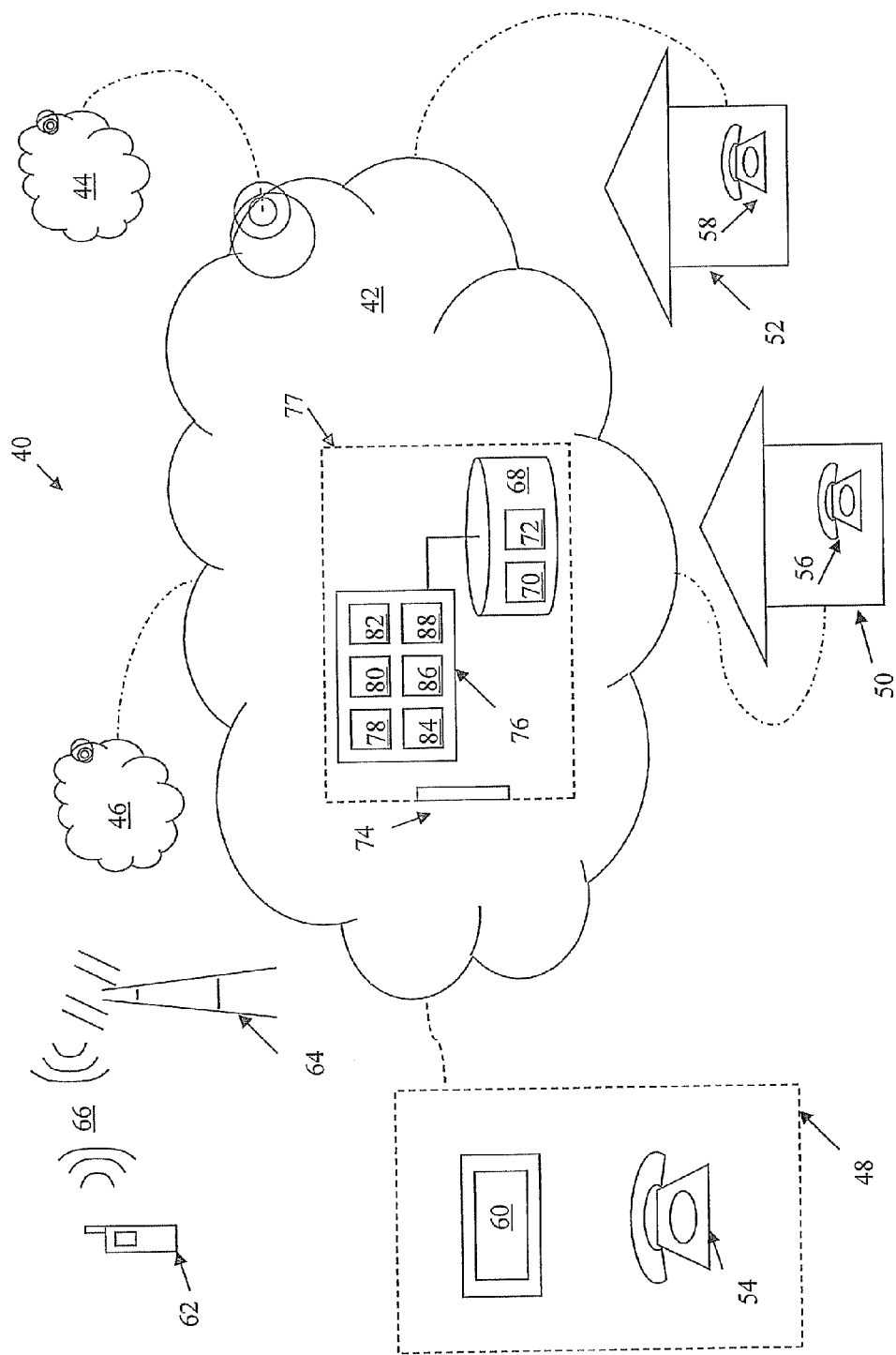
FIG. 2 shows one embodiment of a network implemented messaging system that incorporates teachings of the present disclosure.

A system like the one depicted in FIG. 2 may allow for a pre-recorded message to be sent via VoIP to alert, notify, and/or inform a set of recipients in a timely manner. The system may recognize that a reason to broadcast exists and set up a large number of calls at a local VoIP switch. When an individual call is answered, the call may be "handed-off" to an IP multicast server for playing of the pre-recorded message. If no connection is made, the call attempt may be terminated. Such a solution may allow the PSTN to support broadcasting and to overcome some of the capacity and cost challenges typically associated with circuit switched networks.

Figure 1:
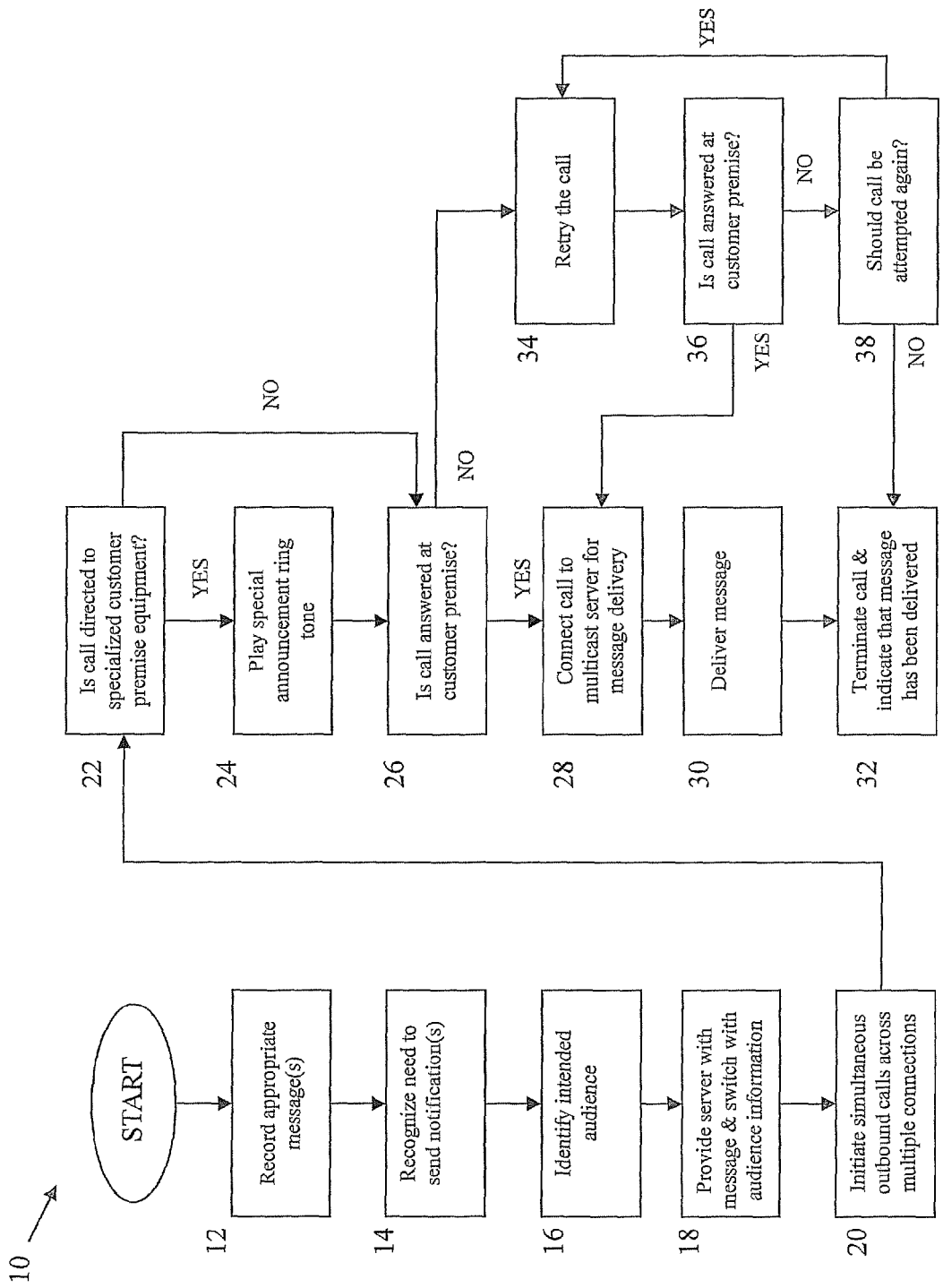
FIG. 1 presents a flow diagram for a message notification process incorporating teachings of the present disclosure.

As mentioned above, FIG. 1 presents a flow diagram for a message notification process 10 incorporating teachings of the present disclosure. At step 12, an administrator may establish a contact list. The list may be compiled from a larger list of available subscribers. The available subscribers may be those with VoIP services, all subscribers without regard to service type, and/or some combination of supported subscribers. Once created, a call list may be associated with a triggering event and an appropriate pre-recorded message.

In some systems, an administrator may be able to remotely establish the call list. For example, an administrator may be presented with a graphical user interface (GUI) at a remote location. The administrator may interact with the GUI to effectuate the creation or modification of one or more call lists and their respective triggers and messages.

Once a list has been established, a network interface or platform may recognize, at step 14, that the triggering event has occurred. For example, an incoming signal may indicate that an emergency situation exists and that the call list needs to be notified of the situation. In one embodiment, process 10 may operate in connection with the EAS. As such, a system executing process 10 may include EAS equipment and "understand" EAS-related protocol.

Generally speaking, EAS equipment used by broadcast stations and cable systems may send and receive messages using a format called the EAS protocol. A typical EAS message has four parts: (1) digital header codes; (2) a two-tone attention signal; (3) an audio and/or video message; (4) and an End of Message code. The header codes may define the nature of the event or emergency (event codes), the location of the emergency (location codes), the party that originated the emergency message (originator codes), and the valid time period of the message (time codes).

The two-tone attention signal, which may be transmitted for eight seconds, provides an audio alert to audiences that emergency information is about to be sent. In systems with specialized Customer Premises Equipment (CPE), such an attention signal may be communicated as a specialized ring tone.

Another emergency protocol that may be recognized by a system executing process 10 is the NOAA Weather Radio ("NWR") Specific Area Message Encoding (SAME) technique, which NWR uses to transmit messages over NWR transmitters around the country. Example codes for various type of emergency situations are listed below in Table 1.

TABLE 1

| Emergency Type | Code |
| --- | --- |
| Avalanche Warning | AVW |
| Avalanche Watch | AVA |
| Child Abduction Emergency | CAE |
| Civil Danger Warning | CDW |
| Coastal Flood Warning | CFW |
| Coastal Flood Watch | CFA |
| Dust Storm Warning | DSW |
| Earthquake Warning | EQW |
| Fire Warning | FRW |
| Hazardous Materials Warning | HMW |
| Law Enforcement Warning | LEW |
| Local Area Emergency | LAE |
| Network Message Notification | NMN |
| 911 Telephone Outage Emergency | TOE |
| Nuclear Power Plant Warning | NUW |
| Radiological Hazard Warning | RHW |
| Shelter in Place Warning | SPW |
| Special Marine Warning | SMW |
| Tropical Storm Warning | TRW |
| Tropical Storm Watch | TRA |
| Volcano Warning | VOW |

Other triggering situation may involve a Missing Child Statement (MIS) event code, which may to be used in connection with local, state, and regional AMBER Plans. As mentioned above, triggering event codes may include a location code in addition to an event code. An entire call list may not need to be notified in situations where the event is limited to a specific location. Location codes may include a six-digit numerical code that indicates what geographic area may be affected by an emergency. These codes may have three separate parts. The "SS" portion of the location code may be a two-digit number that identifies the state or territory in which the emergency is located. The "CCC" portion of the location code may be a three-digit number that identifies the county or city affected by the emergency. The "P" portion of the location code may be an optional portion that allows the message originator to divide the area identified in the "CCC" portion into multiple sections to further pinpoint the affected area. The "SS" and "CCC" portion may include unique Federal Information Processing Standard numbers assigned by the National Institute of Standards and Technology.

Whatever format a triggering event notification takes, process 10 may advance to step 16 and an intended audience may be identified. The audience may be all or part of the call list or supported subscribers. At step 18, the message associated with the call list may be made available to an IP multicast server and contact information associated with the call list may be made available to a VoIP switch. The contact information may include individual VoIP telephone numbers for listed parties. It may also include other forms of contact information for one or more of the listed parties, such as an electronic mail address, a Plain Old Telephony Service telephone number, an Instant Messaging address, a Short Messaging Service address, an Enhanced Messaging Service address, a Multimedia Messaging Service address, and a wireless telephone number. Some of the other forms of contact information may be passed to a different device for message delivery. For example, a subscriber may have a VoIP telephone number, a wireless telephone number, and an email address. The VoIP telephone number may be passed to the VoIP switch. The wireless telephone number may be passed to a wireless service provider, and the email address may be passed to an SMTP server, for alternative delivery of an appropriate message.

At step 20, the VoIP switch may initiate simultaneous outbound calls across multiple connections. A given switch may be capable of supporting hundreds of simultaneous connections, and the switch may make use of all or some significant percentage of this capacity when beginning the message broadcasting process. At step 22, the type of CPE being called may be determined. If the CPE supports advanced functionality like specialized incoming call notification features, process 10 may advance to step 24. At step 24, a signal may be communicated to the specialized CPE directing a specialized announcement, and the process may advance to step 26. The specialized announcement may be similar to the EAS emergency tone, it may be a spoken message explaining that the incoming call is associated with the broadcast notification service, and/or some other special "ring tone."

If it is determined at step 22 that the called CPE does not have the appropriate advanced feature set, process 10 may skip to step 26. At step 26, a system implementing process 10 may determine if the call has been answered. If answered, the call may be connected to the IP multicast server at step 28. At step 30, the pre-recorded message may be played to the party answering the call, and at step 32 the call may be terminated. Step 32 may also involve indicating in an appropriate location that the message was successfully delivered to party answering the call.

If at step 26 the call was not answered, process 10 may advance to step 34. At step 34, the system implementing process 10 may retry the call. The retry may occur immediately, after some time interval has passed, at a random time, and/or in accordance with a suggested call time output by a call scheduler. At step 36, a system may determine if the retry call was answered. If it was answered, process 10 may loop back to step 28, and the call may be treated accordingly. If the retry again goes unanswered, process 10 may advance to step 38, where it may be determined to stop retrying the call. If there should be no more retry attempts, process 10 may advance to step 32 and the call attempts may be terminated. If the call should be retried, process 10 may loop back to step 34 and treated accordingly.

As mentioned above, FIG. 2 shows one embodiment of a network implemented messaging system 40 that incorporates teachings of the present disclosure. As depicted, system 40 includes a communication network 42, which may include the PSTN, a cable network, a wireless service provider network, and/or some other network capable of supporting the communication of packetized information. Network 42 may be communicatively coupled to other networks like Public Internet 44 and cellular network 46.

In some embodiments, network 42 may provide telecommunication services to several subscribers. As shown, network 42 is communicatively coupled to premises 48, 50, and 52. Each of these premises has a least one telephone station identified as telephones 54, 56, and 58, respectively. These telephones may be capable of VoIP communications and the subscribers associated with each of these telephones may subscribe to a VoIP service offered by of the operator of network 42.

In addition to the depicted VoIP telephones, a given subscriber may have other electronic devices capable of receiving messages. For example, the subscriber associated with premises 48 may have a computer 60 and a wireless communication device 62 capable of communicating with a node 64 of cellular network 46. Wireless communication device 62 may be capable of Radio Frequency communication 66 that employs a 2.5G mobile technology like GPRS or EDGE. Device 62 may also employ higher bandwidth offerings like 3G/UMTS.

In operation, system 40 may rely on a memory 68 maintaining contact information for a collection of subscribers to be notified in response to a given notification signal. The collection of subscribers may include the subscribers residing at premises 48, 50, and 52, and the contact information may include Voice over Internet Protocol (VoIP) telephone numbers for each of the subscribers. Memory 68 and/or some other storage location may include a notify list 70 that includes the collection of subscribers to be notified in response to a specific notification signal and an additional list 72 containing a second collection of subscribers to be notified in response to a second specific notification signal.

In practice, the lists could be implemented as a single list with a notification field. The notification field may indicate that a given subscriber should be effectively included on more than one specific notification list. For example, the subscriber associated with premises 48 may want and/or need to be notified in response to three different notification signals. The notification field of the list including the subscriber may have one or more flags indicating that the subscriber should be notified in response to receipt of any or all of the three notification signals.

Within system 40, a notification signal may be received via a network interface 74. The signal may be passed to a computing platform 76, which may be implemented as one or more servers, computing devices, engines, mechanisms, and/or some other combination of hardware, software, and firmware. In some embodiments, computing platform 76, memory 68, and interface 74 may be associated with a VoIP messaging center 77.

In operation, network interface 74 may receive a notification signal and output a trigger signal. A VoIP switch 78 may be responsive to the trigger signal and may be capable of supporting a plurality of simultaneous connections with remote premises. As such, VoIP switch 78 may be able to initiate outbound VoIP calls to a plurality of subscribers. Platform 76 may also include a call answered mechanism 80, which may be capable of recognizing that a subscriber associated with premises 50 has answered a given VoIP call placed to that subscriber. In response to this recognition, the call to that subscriber may be passed to an Internet Protocol (IP) multicast server 82. Server 82 may take over the VoIP call and deliver a message to the subscriber during the call.

The to-be-delivered message may have been pre-recorded and associated with a given notification signal and/or notify list. For example, the subscriber associated with premises 50 may want and/or need to be notified in response to a given notification signal. The notification signal may have been received by network interface 74 and the subscriber may have been called as a result. A pre-recorded message associated with the notification signal may now be played to the subscriber.

In some embodiments, a component of system 40 may recognize that a given call went unanswered. For example, disposition engine 84 may "know" that the subscriber at premises 48 did not answer the call. Disposition engine 84 may request one or more retry calls to telephone 54. Disposition engine 84 may also "know" that the subscriber has a wireless communication device 62 and may request delivery of the message to device 62. Disposition engine 84 may also recognize that the subscriber has an email account accessible via dial-up, some "always-on" broadband connection, and/or some other data connection. As such, disposition engine 84 may request an alternative connection engine 86 to compose an email message, to attach a file representing the pre-recorded message to the email message, and to output the email message for delivery to the email account.

Though the above described embodiment employs engines, mechanisms, and servers, to implement the features and functions of a VoIP message broadcasting service, other implementations and embodiments could be employed without departing form the teachings of the present disclosure. For example, many of the operations may be implemented by computing platform 76. Computing platform 76 may have access to a computer readable medium holding computer-readable data capable of directing platform 76 and related devices to maintain a call list comprising Voice over Internet Protocol (VoIP) numbers, to recognize an event trigger signaling a request to place a VoIP call to each VoIP number on the call list, to direct a VoIP switch to begin placing VoIP calls to each VoIP number on the call list, to direct the VoIP switch to connect answered calls to an Internet Protocol (IP) multicast server, and to direct the IP multicast server to play a message.

In preferred embodiments, messaging center 77 may support and process multiple notification signals and multiple notify lists. To facilitate creation of notify lists, system 40 may include an administrator interface 88. Interface 88 may allow for local and/or remote creation and modification of notify lists. For example, an administrator may access interface 88 and create a new notify list. With the help of interface 88, the administrator may access a subscriber database to create the new list, which may be little more than a list of VoIP telephone numbers. The administrator may then link and/or associate the list with a given notification signal and a given message file. The administrator may then "approve" the list for live operation—such that if the associated notification signal is received, messaging center 77 will begin attempting VoIP telephone calls to the listed numbers, and answered calls will be forwarded to an IP multicast server for playing of the associated message.

The administrator function may, in some cases, be automated such that new notify lists may be created automatically and/or in near real time. This automation option may allow for the creation of notify lists when needed. If an emergency situation arises in a given area, a notify list including residents in that area may be created and a message similar to a "standard" EAS message may be played in connection with answered calls.

In various embodiments, the telephones, computers, devices, servers, and/or platforms, described above, may take forms including wireless and cordless phones, personal digital assistants, cellular telephones, mobile telephones, laptop computers, desktop computers, mainframes, PSTN switches, Ethernet switches, routers, gateways, hardware, firmware, software, work stations, other options having some level of computing capability, and/or a combination thereof.

The methods and systems described herein provide for an adaptable implementation. Although certain embodiments have been described using specific examples, it will be apparent to those skilled in the art that the disclosure is not limited to these few examples. Note also, that although certain illustrative embodiments have been shown and described in detail herein, along with certain variants thereof, many other varied embodiments may be constructed by those skilled in the art.

The benefits, advantages, solutions to problems, and any element(s) that may cause any benefit, advantage, or solution to occur or become more pronounced are not to be construed as a critical, required, or essential feature or element of the present disclosure. Accordingly, the present disclosure is not intended to be limited to the specific form set forth herein, but on the contrary, it is intended to cover such alternatives, modifications, and equivalents, as can be reasonably included within the scope of the claims below.

What is claimed is:

1. A method comprising:
   initiating, by a notification system including a processor, outbound calls associated with at least two recipients that are to receive a notification message, wherein the outbound calls include a first call to a first telephone address associated with a first recipient of the at least two recipients; and
   in response to a determination that the first call is unanswered, the notification system automatically:
      initiating a second call to a second telephone address included in contact information associated with the first recipient; and
      concurrently initiating generation of an email message to an electronic mail address associated with the first recipient, wherein the email message includes the notification message.

2. The method of claim 1, wherein the outbound calls are initiated simultaneously, and wherein the outbound calls comprise voice over internet protocol calls.

3. The method of claim 1, further comprising delivering notification messages during the first call responsive to a determination that the first call is answered.

4. The method of claim 1, further comprising receiving an event trigger to initiate the outbound calls, wherein the event trigger is associated with the notification message and is associated with identification of the at least two recipients.

5. The method of claim 4, further comprising identifying the at least two recipients and identifying the notification message based on the event trigger.

6. The method of claim 4, wherein the event trigger includes a location code, an emergency type code, and a notification message identifier.

7. A notification system comprising:
   a switch operable to:
      support a plurality of simultaneous connections associated with a plurality of recipients; and
      initiate a first call to a first telephone address associated with a first recipient of the plurality of recipients that are to receive a notification message, wherein the first call is provided via one of the plurality of simultaneous connections;
   a notification mechanism operable to determine whether the first call is answered; and
   a call log engine operable to, when the notification mechanism determines that the first call is unanswered:
      initiate a second call to a second telephone address associated with the first recipient; and
      concurrently initiate generation of an email message to an electronic mail address associated with the first recipient, wherein the email message includes the notification message.

8. The notification system of claim 7, wherein the switch comprises a voice over internet protocol switch.

9. The notification system of claim 7, further comprising:
   a network interface operable to:
      receive a first notification signal; and
      provide a trigger signal to the switch based on the first notification signal, wherein the first call is initiated based at least in part on the trigger signal.

10. The notification system of claim 7, wherein the first notification signal is formatted according to an emergency alert system protocol.

11. The notification system of claim 7, wherein the call log engine is further operable to track a metric associated with delivery of the notification message to the first recipient.

12. The notification system of claim 7, wherein the switch is further operable to:
   determine a device type of a recipient device associated with the first telephone address;
   determine, based on the device type, whether the recipient device is configured to receive and play a specialized ring tone; and
   initiate the first call including the specialized ring tone to the first telephone address responsive to determining that the recipient device is configured to receive and play the specialized ring tone.

13. The notification system of claim 7, wherein the switch includes a simultaneous connections limit, and wherein the switch is further operable to initiate calls to the plurality of recipients via the plurality of simultaneous connections, wherein the plurality of simultaneous connections comprises at least seventy-five percent of the simultaneous connections limit.

14. A computer-readable storage device storing instructions that, when executed by a processor, cause the processor to perform operations including:
   initiating outbound calls associated with at least two recipients that are identified to receive a notification message, wherein the outbound calls include a first call to a first telephone address associated with a first recipient of the at least two recipients; and
   in response to a determination that the first call is unanswered:
      initiating a second call to a second telephone address included in contact information associated with the first recipient; and
      concurrently initiate generation of an email message to an electronic mail address associated with the first recipient, wherein the email message includes the notification message.

15. The computer-readable storage device of claim 14, wherein the operations further include receiving an event trigger identifying the notification message and including an indication of a time period when the notification message is valid.

16. The computer-readable storage device of claim 14, wherein the first telephone address is different from the second telephone address.

17. The computer-readable storage device of claim 14, wherein the first telephone address comprises a first voice over internet telephone number, and wherein the second telephone address comprises a second voice over internet telephone number.

18. The computer-readable storage device of claim 14, wherein the second call is initiated after expiration of a time interval subsequent to determining whether the first call is answered, wherein the time interval is randomly selected.

19. The computer-readable storage device of claim 14, wherein the operations further include generating the email message.

20. The computer-readable storage device of claim 14, wherein the operations further include, in response to the determination that the first call is unanswered, placing one or more additional calls to the first telephone address prior to initiating the second call to the second telephone address.

* * * * *